Jan. 19, 1937.  E. C. COOPER  2,067,892
TESTING APPARATUS
Filed Nov. 19, 1934
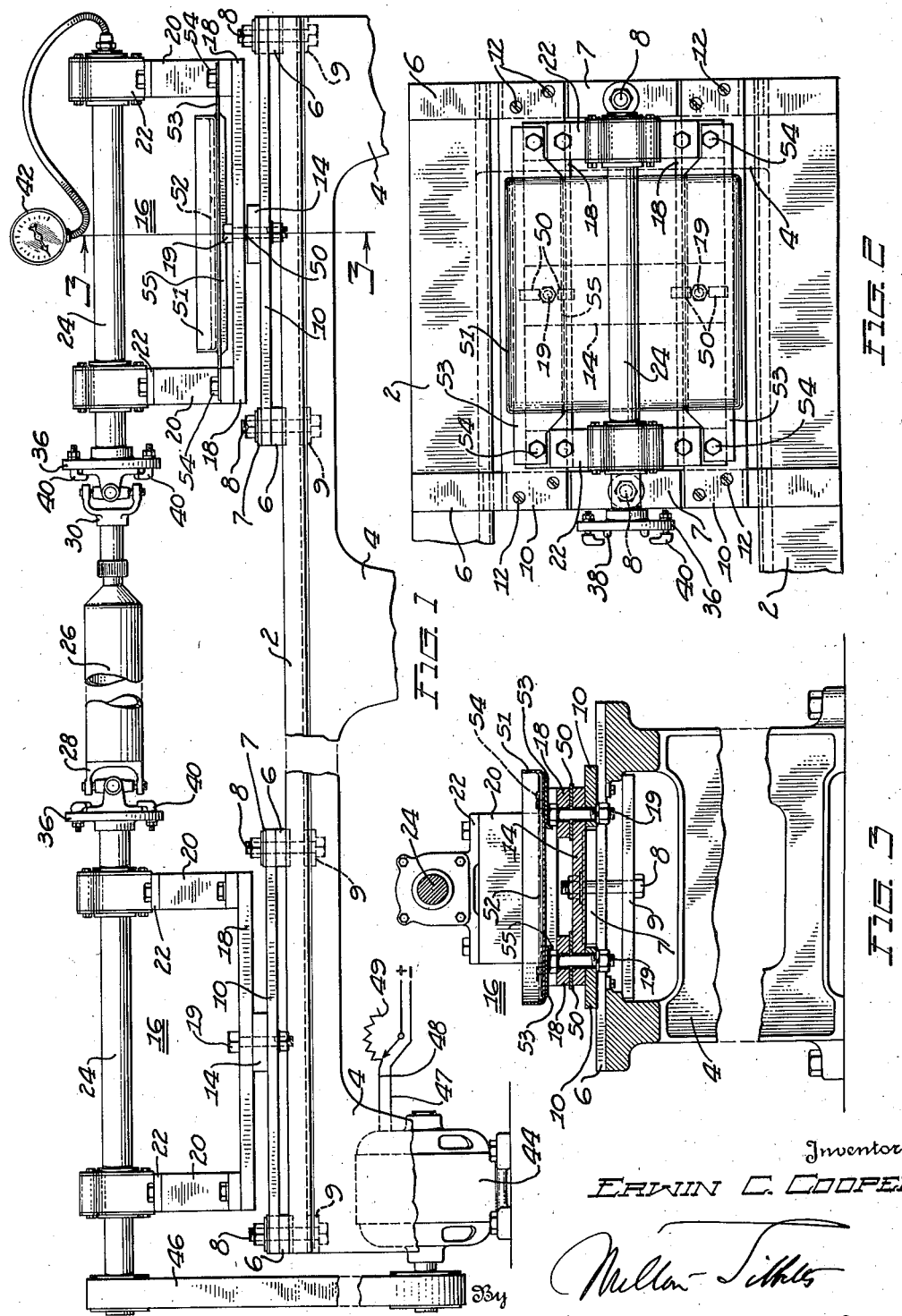
Inventor
ERWIN C. COOPER
By Millon Sittles
Attorney Patented Jan. 19, 1937

2,067,892

UNITED STATES PATENT OFFICE 2,067,892

TESTING APPARATUS

Erwin C. Cooper, Roseville, Mich., assignor to Packard Motor Car Company, Detroit, Mich., a corporation of Michigan Application November 19, 1934, Serial No. 753,613

8 Claims. (Cl. 73—51)

This invention relates to machines for testing the unbalance of rotary parts such as the propeller shafts of motor vehicles.

The invention relates particularly to machines for testing the unbalance of rotary parts of the type in which the machine is provided with means for supporting the part to be tested for rotary movement constructed to permit movements of said part in directions transverse to its axis of rotation under the influence of any unbalanced weight in said part. In such machines the part undergoing a test is usually supported upon one or more vibratory supports.

In certain machines of this type, the unbalance of the part being tested is determined by the operator by placing the hand upon the vibrating support during the testing operation and "feeling" the vibrating movement of the support. This manner of testing the unbalance of a rotary part requires the services of an operator having considerable skill and, since it depends upon the "feel" of the vibrations, it is liable to result in error and can not be relied upon to determine the extent of unbalance of the part.

One object of the present invention is to produce a machine for testing the unbalance of rotary parts by which the unbalance of the part being tested may be quickly and easily determined in a reliable manner by a comparatively unskilled operator.

Another object of the invention is to produce a machine of the above type for testing the unbalance of rotary parts having a novel and improved gage mechanism which gives a clear and easily read indication of the unbalance of the part being tested.

Another object of the invention is to produce a machine of the said type for testing the unbalance of rotary parts having an improved gage mechanism by which the degree of unbalance of the part being tested is distinctly indicated visually.

Another object of the invention is to improve the construction of machines of the said type to enable one end portion of a shaft or of a shaft and associated mechanisms to be subjected to a more sensitive test for unbalance than the other end portion thereof.

With the above and other objects in view the invention consists in a machine for testing the unbalance of rotary parts embodying the novel and improved features hereinafter described and particularly pointed out in the claims, the advantages of which will be readily understood by those skilled in the art.

The invention will be clearly understood from the accompanying drawing illustrating the invention in its preferred form and the following detailed description of the constructions therein shown.

In the drawing, Fig. 1 is a view in side elevation of a machine for testing the unbalance of rotary parts embodying the present invention.

Fig. 2 is a plan view of the right hand portion of the machine shown in Fig. 1 and Fig. 3 is a view in vertical section of the machine taken substantially on the line 3—3 of Fig. 1.

The invention is shown in the drawing of this application as applied to a machine particularly constructed and arranged for testing the unbalance of propeller shafts and universal joints attached to the ends of said shafts such as are embodied in the driving mechanisms of automobiles. The invention, however, is not limited in its application to this particular machine but may be applied with advantage to other machines for testing the unbalance of rotary parts.

In the form of the invention illustrated in the drawing of this application, the machine comprises a bed, indicated at 2, carried on a series of supporting standards 4 and carrying at opposite ends thereof respectively, mechanisms for rotatably supporting the opposite ends of a propeller shaft with the attached universal joint members.

These two mechanisms are very similar in construction and mode of operation. Each of these mechanisms comprises spaced cross bars 6 extending across and resting at their ends upon the bed 2. A plate 7 is applied to the upper side of each cross bar and the cross bar is held down upon the bed of the machine by means of a bolt 8 passing through the plate 7 and the cross bar and through a bar 9 the ends of which engage the lower faces of ledges on the bed. Spaced longitudinal bars 10 rest at their ends upon the cross bars 6 and are secured to the cross bars by means of bolts 12. A central cross bar 14 spans the longitudinal bars 10 and rests at its ends upon the latter bars as clearly shown in Fig. 3.

Supported for vibratory movement by each of the cross bars 14 is a frame indicated as a whole at 16. This frame comprises spaced longitudinal bars 18 supported by the cross bar 14 and connected at their ends by upright blocks 20 to which the bars 18 are bolted. The vibratory frame is secured to the cross bar 14 and both frame and cross bar are secured to the longitudinal bar 10 by means of bolts 19. Secured to the upper faces of the blocks 20 are bearing members 22 in which is journalled a rotary shaft 24 for rotatably supporting one end of the propeller shaft.

The propeller shaft and associated parts being tested comprise a shaft proper indicated at 26 and universal joints 28 and 30 secured to the respective ends of the said shaft. The shaft and universal joints are inserted in the machine and tested as a unit.

To support the propeller shaft and universal joints rotatably upon the shafts 24 a disc 36 is secured to the inner end of each of the latter shafts and upon this disc are mounted pins 38 for engaging in holes in the outer member of each joint to center the same with relation to the disc and said disc is provided with clamping devices 40 for clamping said universal joint member to the disc.

To the shaft 24 at the right hand end of the machine, Fig. 1 is connected a speedometer 42 for indicating the speed of rotation of the shaft. The shaft 24 at the left hand end of the machine is driven from a motor 44 through a belt 46 passing about pulleys respectively mounted on the shaft of the motor and the shaft 24, the belt being inclined at a relatively large angle to the vertical. The circuit for the motor comprises conductors 47 and 48 connected therewith and a rheostat 49 by which the current through the motor is controlled to control the speed thereof. By the adjustment of the rheostat, the speed of the motor and of the shafts is varied to drive the propeller shaft and universal joints at different speeds during the testing operation.

Each of the frames 16 is mounted for vibratory movement about its points of support, the opposite ends of the frame moving vertically in opposite directions during its vibrating movements. This construction for supporting the shaft being tested enables said shaft to move transversely in vertical directions under the influence of any unbalanced weight in the shaft or the associated parts. The vibratory movements of each frame 16 are produced against a yielding resistance.

It is desirable to subject the forward end of the propeller shaft which is to be attached to the driven shaft of the transmission to a more sensitive test for unbalance than the other end of the propeller shaft for reasons well known to those skilled in the automobile art. Fig. 1 of the drawing shows the propeller shaft supported in the machine with the universal joint at the forward or transmission end of said shaft secured to the right hand shaft 24. The left hand frame 16 is supported upon the cross bar 14. This manner of supporting the frame permits said frame to vibrate angularly in a vertical plane about its points of support to some degree under the influence of forces tending to cause movements of the shaft and associated parts being tested in directions transverse to the axis in rotation. During these vibrations the bars 18 are flexed and the bars 10 may be flexed to a less degree. In order to support the right hand frame 16 so that it will vibrate more readily, plates 50, relatively narrow as compared with the cross bar 14, are inserted between said bar and the longitudinal bars 18 of the vibratory frame. This manner of supporting the longitudinal bars 18 of the right hand frame enables said frame to vibrate angularly in a vertical plane with relation to the cross bar 14 about the points of support of the bars 18, the bars 18 flexing during these movements. The relatively narrow supports for the bars 18 enable the right hand frame 16 to vibrate more readily than the left hand frame and render the same more sensitive than the left hand frame to forces tending to cause movements of the shaft and associated parts being tested in directions transverse to the axis of rotation.

The gage mechanism for indicating the vibrations of the right hand frame 16 produced by unbalanced weights in the propeller shaft and associated parts during the rotation of said shaft comprises a relatively shallow pan 51 preferably made of sheet metal and containing a quantity of oil or other liquid. This pan is supported on the right hand frame 16 so that it is subjected to the vibratory movements of said frame. The pan is preferably supported on the frame by resilient supports which amplify the vibrations of the frame. To this end, in the construction shown, spaced, flexible, resilient pan supporting strips 53 are each secured at the ends thereof to the upper faces of laterally projecting portions of the blocks 20 by means of bolts 54. These strips are preferably turned down at their inner margins as indicated at 55 to stiffen the same. The pan rests upon and is preferably secured to the strips as by welding the same to the strips. As clearly shown in Figs. 2 and 3 the supporting strips are relatively narrow as compared with the width of the bottom of the pan and said strips extend inwardly for only a relatively short distance from the side edges of the pan bottom, the central portion of the pan bottom thus being left free to vibrate vertically. With this construction the pan bottom constitutes a flexible diaphragm which amplifies the vibrations imparted to the liquid within the pan by the vibrations of the pan. The body of liquid within the pan is preferably comparatively shallow so that the weight of the same will not damp materially the vibrations of the pan bottom.

In testing a propeller shaft and associated parts on the present machine the shaft with the attached parts is inserted between and secured to the shafts 24 and the machine is then started and run up to and including the critical speed for the particular line of shafts under test. As the speed of the shaft is varied the liquid in the pan 51 is carefully observed by the operator. Whenever, at any speed within the range through which the shaft is driven, waves are produced upon the surface of the liquid in the pan 51, this indicates an unbalanced weight in the propeller shaft and associated parts which is producing substantial vertical movements of the shaft and corresponding vibrations of the right hand vibratory frame 16. These waves vary in height in proportion to the extent of vibration of the right hand frame and under certain conditions the disturbance may be so great that particles of the liquid will be projected above the surface thereof. By observing the extent of the disturbance of the surface of the liquid the operator may readily determine the extent of unbalance of the shaft.

In the present construction, the presence of an unbalanced weight anywhere longitudinally of the axis of the propeller shaft and associated parts will produce transverse movements of the shaft and said parts during their rotation and these movements will be transmitted to the right hand vibratory frame 16. The presence of an unbalanced weight between the longitudinal center of the shaft and the forward (right hand) end thereof will produce a greater vibratory movement of the right hand frame 16 than the presence of the same unbalanced weight between the center of said shaft and the rear (left hand) end thereof, assuming that the weight in both cases is located at the same distance from the center of the shaft. The machine thus is particularly sensitive to the presence of unbalanced weights in the shaft and associated parts between the center and the forward end of the shaft as is desired.

It is to be understood that the invention is not limited to the particular construction and arrangement of parts of the illustrated embodiment of the invention but that the invention may be embodied in other forms within the scope of the claims.

What is claimed is:

1. A machine for testing the unbalance of rotary parts comprising a substantially stationary base, supporting means for a rotatable part, a connection between said base and said supporting means allowing said means to move in directions transverse to the axis of rotation of the part carried thereby, and an open liquid containing pan on said supporting means, said pan having a flexible bottom, a disturbance of the liquid surface caused by movement of said supporting means amplified by the flexible pan bottom indicating the balance of said part.

2. A machine for testing the unbalance of rotary parts comprising means for rotatably supporting a part to be tested constructed to permit movements thereof in directions transverse to its axis of rotation and vibration indicating mechanism including a container having a flexible bottom, yieldable means for supporting the container responsive to vibration by such transverse movements of said part and a quantity of liquid in said container.

3. A machine for testing the unbalance of rotary parts comprising a substantially stationary base, means for supporting a rotated part to be tested, a connection between said means and said base allowing said means to move in directions transversely of the axis of rotation of said part under the influence of any unbalanced weight in the part, and gaging means including an open container having a flexible bottom mounted on said means and a quantity of liquid in said container.

4. A machine for testing the unbalance of rotary parts comprising a substantially stationary base, means for rotatably supporting one end of a shaft permitting movements of the shaft in directions transverse to its axis of rotation under the influence of an unbalanced weight therein, a yieldable mounting on said base for said means, and gage mechanism including a container arranged to be vibrated by said transverse movements of the shaft, the bottom of said container forming a flexible diaphragm, and a quantity of liquid in said container having its upper surface exposed for observation.

5. A machine for testing the unbalance of rotary parts comprising a base, a yieldable mounting on said base, means carried by said mounting for rotatably supporting the part to be tested constructed to permit movements of said part therewith in directions transverse its axis of rotation, and indicating means including a container on said mounting arranged to be vibrated by said transverse movements of said mounting, said container having a flexible bottom, a body of liquid located in said container and means for rotating said part at varying speeds.

6. In a machine for testing the unbalance of rotary parts having means for rotatably supporting a part to be tested, gage mechanism comprising a pan having a flexible bottom and subject to vibrations produced by the rotations of said part, and means for supporting the pan to allow the pan bottom to vibrate freely and a body of liquid in said pan.

7. In a machine for testing the unbalance of rotary parts having means for rotatably supporting a part to be tested, vibration gaging means comprising flexible, resilient straps supported at their ends and subject to vibrations produced by the rotary movement of said part, a container supported on said straps between the ends thereof, and a body of liquid in said container.

8. In a machine for testing the unbalance of rotated parts, gage mechanism comprising a liquid containing pan, and yieldable supporting means for said pan subjected to vibrations produced by a part rotated on said machine, said pan having a flexible bottom for amplifying vibrations of said supporting means upon the surface of the liquid.

ERWIN C. COOPER.